United States Patent [19]

Anders

[11] 4,365,946

[45] Dec. 28, 1982

[54] APPARATUS FOR CONTINUOUSLY PROCESSING RUBBER, ELASTOMERS, PLASTICS AND LIKE MATERIALS WHICH CAN BE VULCANIZED OR CROSS-LINKED

[75] Inventor: Dietmar Anders, Hanover, Fed. Rep. of Germany

[73] Assignee: Hermann Berstorff Maschinenbau GmbH, Hannover Kleefeld, Fed. Rep. of Germany

[21] Appl. No.: 228,787

[22] Filed: Jan. 27, 1981

[30] Foreign Application Priority Data

Feb. 1, 1980 [DE] Fed. Rep. of Germany ....... 3003614

[51] Int. Cl.³ ............................................. B29F 3/08
[52] U.S. Cl. ..................... 425/144; 264/68;
264/236; 264/347; 366/79; 366/82; 425/191;
425/206; 425/376 B; 425/379 R; 425/461;
425/467
[58] Field of Search ...................... 425/381, 190–191;
366/79, 82

[56] References Cited

U.S. PATENT DOCUMENTS

| 3,203,048 | 8/1965 | Daubenfeld | 425/376 B |
|---|---|---|---|
| 3,256,561 | 6/1966 | Rodenacker | 366/82 |
| 3,276,075 | 10/1966 | Harwood | 425/376 B |
| 3,879,158 | 4/1975 | Schele | 425/467 |
| 4,076,481 | 2/1978 | Sansone | 425/467 |
| 4,098,861 | 7/1978 | Bassani | 264/174 |
| 4,201,480 | 5/1980 | Brand | 425/461 |
| 4,250,132 | 2/1981 | Beach | 264/68 |

FOREIGN PATENT DOCUMENTS

| 1197438 | 6/1961 | Fed. Rep. of Germany | 366/79 |
|---|---|---|---|
| 2350249 | 4/1975 | Fed. Rep. of Germany | 425/381 |
| 2308284 | 2/1978 | Fed. Rep. of Germany | |
| 77062 | 11/1970 | German Democratic Rep. | 425/467 |
| 52-60875 | 5/1977 | Japan | 264/236 |
| 53-19029 | 6/1978 | Japan | 264/176 R |
| 1303643 | 1/1973 | United Kingdom | 264/68 |

Primary Examiner—Jeffery R. Thurlow
Attorney, Agent, or Firm—Schwartz, Jeffery, Schwaab, Mack, Blumenthal & Koch

[57] ABSTRACT

Apparatus located at the output end of a screw extruder comprising a mandrel to rotate with said screw and a jacket coaxial with the mandrel and rotatable in an opposite direction of rotation to the mandrel at a speed which is steplessly adjustable. Sealing lips co-operating with abrasion rings are preferably provided on relatively moving surfaces of the jacket and stationary housings and temperature adjustment means can be provided in the jacket and the mandrel.

11 Claims, 1 Drawing Figure

U.S. Patent    Dec. 28, 1982    4,365,946
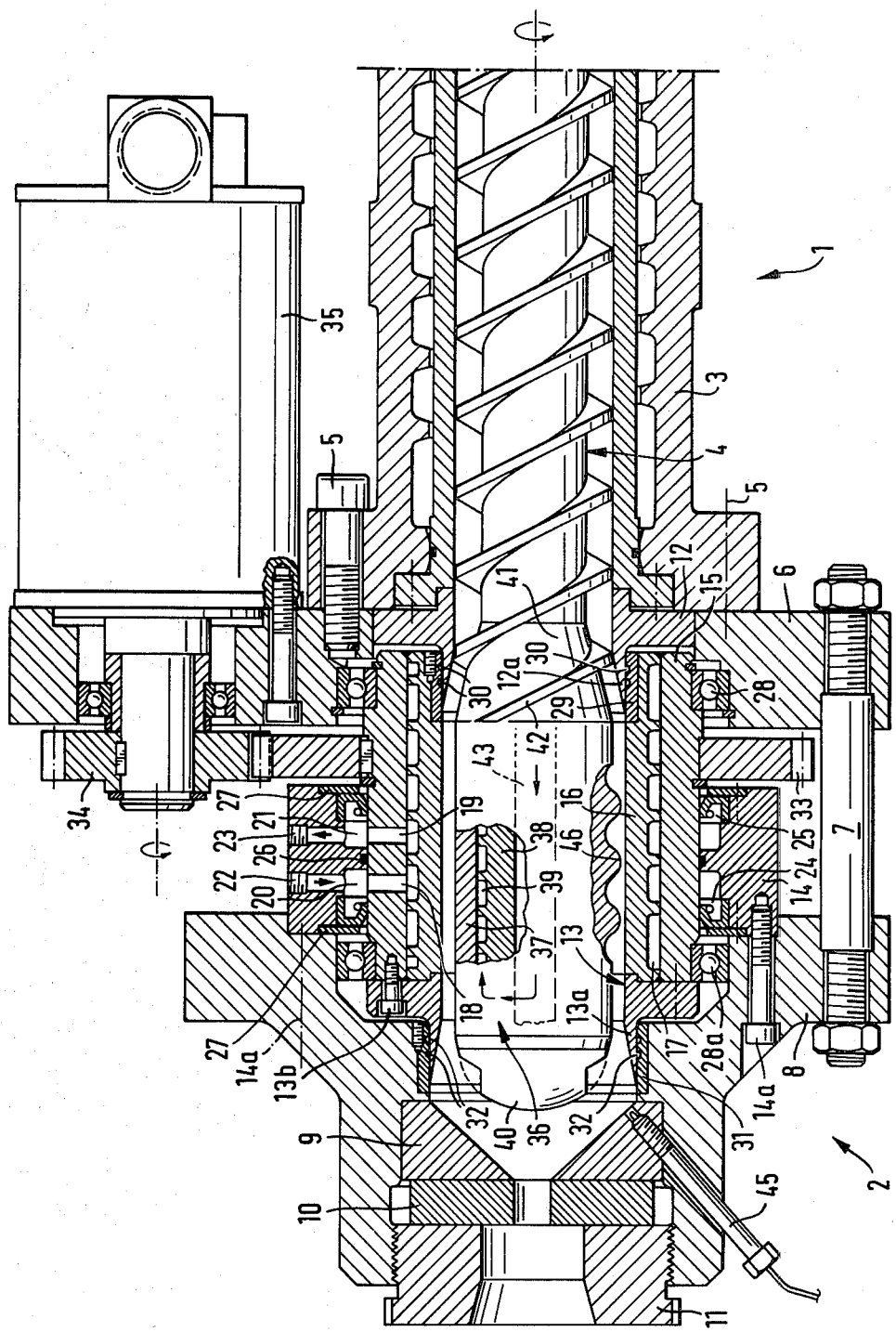

APPARATUS FOR CONTINUOUSLY PROCESSING RUBBER, ELASTOMERS, PLASTICS AND LIKE MATERIALS WHICH CAN BE VULCANIZED OR CROSS-LINKED

The invention relates to apparatus for continuously processing rubber, elastomers, plastics and like materials which can be set by heat, that is to say vulcanised or cross-linked. The vulcanisation or cross-linking of the material worked up in an extruder can be initiated by a relative movement of machine components, comprising a rotatable mandrel and a jacket which coaxially surrounds the mandrel at a spacing.

Shearing components provided downstream of extruders are known from published German Application No. 2 308 284. As a means of increasing temperature and initiating cross-linking these apply mechanical forces e.g. to elastomers and the amount of force can be varied during the process independently of any predetermined flow volume. The mechanical forces are applied to the material by relative movement between components of the machine, particularly by a rotating mandrel and a stationary jacket or by a stationary mandrel and a rotating jacket.

The mechanical forces, in the form of shearing energy, thus applied to the material to be processed, are used to initiate vulcanisation or cross-linking. The purpose of such apparatus is to bring the material to the temperature at which heat setting, that is to say vulcanising or cross-linking occurs even when it is leaving the moulding tool, e.g. a profiled head or tubular head. The advantage of such a method is that the heating required for cross-linking or vulcanising operations can be considerably reduced. Since the material leaving the tool is already at the cross-linking or vulcanising temperature, the only apparatus required is one which can maintain this temperature for a certain time. Elongate passages supplied with warm air are generally used for this purpose; they are equipped with a conveyor belt to receive the strand of material leaving the tool.

With apparatus of this type complex micro-wave or salt bath vulcanising installations become unnecessary.

However, the apparatus disclosed in the above mentioned published German Application has considerable defects. The greatest disadvantage of such apparatus is that a considerable drop in pressure has to be accepted. This is because the arrangement is based on the need to reduce the diameter of the working-up portion relative to the extruder, in order to obtain an appropriate pressure drop and an appropriate rise in temperature. The reduction in diameter results in uncontrolled heating of the material to be processed, thus making it impossible for the cross-linking or vulcanising temperature to be accurately maintained.

Since the discharge zones of normal venting extruders can build up only a relatively low tool pressure without the venting zone overflowing, considerably longer discharge zones and thus long and expensive extruders must be used for the apparatus described. If the vulcanising or cross-linking component in the above mentioned published German Application is not to have a longer extruder, i.e. is to be combined with existing normal venting extruders, then apart from the vulcanising or cross-linking component at least a new screw must be provided, with greatly throttled discharge per revolution, so that the discharge zone can build up the high counter pressure of the known vulcanising or cross-linking apparatus without overflowing the venting zone. Overflowing of the venting zone would immediately prevent any venting of the materials to be processed, because the venting pipes would at once become obstructed by the overflow.

It is also known from the operation of extruders for sheathing cables, operating with a cross head and thus again with high resistance and high extrusion pressures, that the high pressures result in a flow-back in the screw thread, creating very high temperatures in the material and thus causing areas of incipient vulcanisation, which make it impossible to extrude profiled cross-sections true to size.

The apparatus described in the published German Application does not otherwise disclose any aid towards solving one of the greatest problems of the working up components, namely that of sealing. Since a relatively high pressure prevails in the vulcanising or cross-linking component, and since rotating components are present, considerable difficulties arise in respect of sealing. One has to ensure that no material can enter the drive unit for the rotating jacket or the bearing and temperature control means for the jacket.

The invention therefore has among its objects to provide apparatus which will enable the heat setting i.e. vulcanisation or cross-linking process to be initiated in the machine component provided for the purpose, without any disadvantageous, increased pressure drop and consequent, hardly controllable temperature distribution, and without any local, incipient vulcanisation taking place in the screw threads of the discharge zone.

The pressure drop in such a vulcanising or cross-linking component for initiating the vulcanising or cross-linking process must further be considerably reduced, so that existing extruders can be used and a high output per screw revolution becomes possible.

The invention must further ensure that no material can enter and become vulcanised in the drive unit, the bearing for the jacket and the temperature control means for the jacket.

According to the invention there is provided apparatus for continuously processing rubber, elastomers, plastics and the like materials which can be set by heat, said apparatus comprising a mandrel and a jacket, with said jacket surrounding said mandrel coaxially at a spacing therefrom, and in operation of said apparatus heat setting of material fed by the screw of an extruder is initiated by relative movement of said mandrel and said jacket, wherein said mandrel is disposed coaxially with said screw and is secured to the downstream end of said screw for rotation therewith, and means are provided for rotating said jacket in the opposite direction to the direction of rotation of said mandrel and at a rotary speed which is steplessly adjustable.

Preferably said mandrel has at least as large a diameter as said screw.

The fact that the mandrel has at least the diameter of the screw and is arranged axially in front of the screw and secured against rotation with respect to it greatly reduces the drop in pressure, although the depth of thread in the vulcanising or cross-linking portion of the apparatus is reduced relative to that in the extruder. The reduction in the predetermined free cross-section in the extruder cylinder can therefore be minimised.

Preferably the mandrel is profiled with rounded webs at a greater positive gradient, although there is still advantageously a substantially larger clearance between the screw and the wall of the casing, and this enables the drop in pressure to be further reduced and automatic cleaning of the vulcanising or cross-linking component to be obtained when the tool has been removed.

When the female mould has been removed, the screw including the vulcanising or cross-linking component can be taken out of the extruder cylinder for inspection and possible cleaning, without any further dismantling of extrusion heads.

It is particularly important that no diversion of the flow of material is necessary, since the vulcanising or cross-linking component is arranged in the conveying direction of the screw. Diversion of a highly viscous mass results in a considerable drop in pressure with an uncontrollable effect on the temperature of the material.

The non-rotatable arrangement of the mandrel on the tip of the screw allows for intensive temperature control of the vulcanising or cross-linking component. It also ensures that the rubber mix can pass with more favourable flow conditions—without any dead corners—from the discharge zone of the screw, where there is as little shearing as possible, into the intensively temperature controlled component where there is strong, controlled shearing.

The fact that the jacket is turned in the opposite direction to the mandrel and that its rotary speed is steplessly adjustable means that large and highly controlled relative movement between the mandrel and the jacket are possible, with consequent purposeful action on and control of the temperature of the material.

The rotary speed of the jacket and that of the screw can be kept lower, since when the jacket speed is zero basic shearing takes place according to the speed of the screw. The efficiency of the apparatus is thereby greatly improved.

Preferably an annular input adapter is provided between the cylinder of the extruder and the jacket and has an annular sealing lip thereon projecting into the rotating jacket. This can give an excellent seal relative to the drive, the bearings and temperature control means for the jacket, as the result of the internal pressure. The downstream end of the jacket is equipped with a corresponding output adapter, to provide a seal thereto. It is particularly important that any wear on the rotating parts should not result in leakage. For this reason the sealing lips formed on the adapters each co-operate with a respective annular abrasion ring which ends flush with the jacket. One or more annular slots are provided in the ring, and any material passing through is collected in these slots, thereby further enhancing the sealing action. It is technically particularly important that the material should not flow towards the sealed apertures as it passes through the vulcanising or cross-linking component, since this would lengthen residence time in certain areas and thus lead to vulcanisation.

As a means of providing for uniform and rapid control of the temperature of the jacket, the jacket comprises an inner and an outer member; helical temperature control grooves are formed in the outer face of the inner jacket and covered by the outer jacket. An inlet and an outlet port are provided in the outer jacket; these again communicate with annular slots in a stationary, cylindrical seal carrier surrounding the outer jacket, and are provided for the inflow and outflow of the temperature control medium.

An advantageous way of driving the jacket so that it can rotate in the opposite direction to the mandrel and at a steplessly variable speed, is to provide external teeth on the outer jacket, the teeth inter-acting with a pinion, of a drive unit. It is an advantage to provide two opposing drive units, so that there are no radial forces acting on the bearings. A transition piece which is provided between the extruder screw and the mandrel, extends conically at the mandrel side and has conveying webs disposed on it; the material is thereby uniformlly distributed between the mandrel and the jacket without any appreciable loss of pressure. It has been found very advantageous to allow the temperature of the mandrel to be controlled, as a means of obtaining still more accurate temperature control in the working up component.

The invention is diagrammatically illustrated by way of example in the accompanying drawing which shows a sectional view through one embodiment of apparatus according to the invention.

An extruder component has a vulcanising and cross-linking component 2 mounted at the downstream end thereof. The extruder component 1 comprises an extruding cylinder 3 and an extruding screw 4. An upstream end plate 6 of the vulcanising and cross-linking component 2 is joined to a flange on the cylinder 3 by means of screws 5. The end plate 6 is screwed to a downstream end plate 8 by spacer bolts 7.

The plate 8 holds an insert 9, which is disposed in front of a profile disc 10 and fixed by a screw means 11. An input adapter 12, provided with welded on sealing lips 12a, is disposed between the extruding cylinder 3 and a rotatable jacket 15, 16. An output adapter 13, again provided with sealing lips 13a, is screwed to the outer part 15 of the jacket.

The jacket, which is of rotatable construction, comprises the outer jacket 15 and an inner one 16. Helical temperature controlled passages 17 are formed in the outer face of the inner jacket 16 and allow for circulation of a temperature control medium. For this purpose the passages 17 communicate with an inlet port 18 leading through the outer jacket 15, an annular slot 20 and an inlet 22 for the temperature control medium.

An outlet port 19, formed in the outer jacket 15, communicates with an annular slot 21 and an outlet 23, to ensure continuous circulation of the medium.

The annular slots 20 and 21 are made tight by seals 24, 25, 26, which are supported by a stationary, cylindrical seal carrier 14. The carrier 14 is screwed to the end plate 8 by a screw 14a.

The seals 24 and 25 are held in position by retaining plates 27. The jacket 15, 16 is mounted by means of a fixed bearing 28 and a floating bearing 28a. In order to limit wear caused by the rotating jacket 15, 16 to a certain part, a cylindrical abrasion ring 29 is inset into the inner jacket 16 with its inner face 29 flush with the bore of the inner jacket 16. Annular slots 30 are provided in the face 29 to collect any material entering there. The slots 30 filled with material enhance the sealing action.

The output adapter 13 is screwed to the outer jacket 15 by screws 13b and rotates with the jacket 15, 16. The sealing lips 13a of the adapter 13 rotate on an abrasion ring 31 in the abrasion face of which annular slots at 32 are formed. The slots 32 too receive any material entering them and then fulfil an additional sealing function.

External teeth 33 are provided on the outer jacket by means of an adjusting spring connected to a drive pinion 34. The pinion 34 can be rotated by a drive unit 35. A mandrel 36 is provided in the vulcanising and cross-linking component 2 and is secured to the screw 4 by a conical transition piece 41 in a manner to prevent relative rotation between the mandrel 36 and screw 4.

The mandrel 36 comprises a jacket 37 and a core 38. Helical temperature control passages 39 are formed in the core 38 and are covered by the jacket 37. A liquid temperature control medium passes through a central bore 43 in the mandrel 36 and into the helical passages 39 and from there is returned in the usual known manner. An end cap 40 is provided for the mandrel 36.

A temperature probe 45 is mounted in the end plate 9. The speed of rotation of the jacket 15, 16 is controlled on the basis of the temperatures read from the probe 45, i.e. when the temperature is too low the speed is increased, in order to give greater relative movement between the rotating mandrel 36 and the jacket 15, 16 which is rotating in the opposite direction, thereby to cause an increase in temperature. The temperature control of the jacket 15, 16 by means of a circulatory medium and that of the mandrel 36 are also utilised to obtain precise regulation of temperature. For this purpose further temperature probes may be arranged in the mandrel itself and/or at other positions in the vulcanising and cross-linking component 2. An appropriate mean value is obtained from the values read from the temperature probes, and this forms the basis for regulation of the speed of the rotating jacket 15, 16 and/or of the temperature control of the jacket 15, 16 and mandrel 36.

The apparatus illustrated operates as follows:

Material worked-up in the extruder component 1 is conveyed into the vulcanising and cross-linking component 2 by means of the screw 4. The conical transition piece 41 has conveying webs 42 thereon which distribute the material to be vulcanised or cross-linked evenly over the periphery of the mandrel 36. The speed of rotation of the jacket 15, 16 is set according to the values measured by the temperature probe 45, i.e. the material to be vulcanised or cross-linked is brought to a temperature which will ensure initiation of vulcanisation or cross-linking, by means of the speed of the jacket and the medium controlling the temperature of the jacket and mandrel. As a means of preventing initial vulcanisation in the wall region, where the material remains longer than in the centre of the flow passage, it is advantageous to keep the temperatures of the jacket 15, 16, the mandrel 36 and end plate 8 below vulcanising temperature and the temperature at which the mass is discharged.

During the initial phase of vulcanisation the material is still plastic and can be deformed in an adjoining tool. In the drawing this tool is formed by the insert 9 of the profile disc 10 and the screw means 11. The temperature of the material in the vulcanising or cross-linking component 2 must be controlled so that the strand material emerging from the profile disc 10 has that particular cross-linking or vulcanising temperature. The strand is then fed e.g. to an elongated heating passage in which a revolving conveyor belt is arranged to receive the strand.

In this heating passage it is only necessary for the temperature already present in the strand to be maintained for a determined time. When such time has elapsed and the material has left such a passage it is completely vulcanised and can be cooled and wound up. Thus vulcanisation in apparatus provided specially for the purpose, such as micro-wave vulcanising or other equipment is not necessary.

On the underside of the mandrel 36 in the drawing an alternative embodiment is shown in that the surface of the mandrel is profiled to have rounded webs 46 extending at quite a steep positive gradient e.g. an angle of 30°-60°, measured between a perpendicular and the axis of the mandrel. The alternative form of the mandrel illustrated here can further reduce pressure loss and automatic cleaning of the vulcanising or cross-linking component 2 is obtained, since the webs 46 cause the material to be transported.

What is claimed is:

1. Apparatus for continuously processing rubber, elastomers, plastics and the like materials which can be set by heat, comprising:
   (a) an extruding cylinder and an extruding screw mounted for rotation therein,
   (b) means for driving said screw,
   (c) an elongated mandrel disposed coaxially with said screw and secured to the downstream end of said screw for rotation therewith,
   (d) jacket means surrounding a substantial portion of the length of said mandrel and spaced therefrom to provide an axially extending annular opening in which the material is vulcanised, and
   (e) means for rotating said jacket means at an adjustable speed in a direction opposite to the direction of rotation of said screw and mandrel, whereby the relative rotary movement of said mandrel and said jacket means permits the temperature to be controlled in said annular opening between said jacket means and said mandrel so as to achieve optimum vulcanisation of the material.

2. The apparatus claimed in claim 1, wherein said mandrel has at least as large a diameter as said screw.

3. The apparatus claimed in claim 1, further including an annular input adapter connected to said extruder cylinder and disposed between said cylinder and said jacket means, said adapter having an annular sealing lip thereon extending toward said jacket means for sealing the same.

4. The apparatus claimed in claim 1, wherein said jacket means comprises an inner and outer jacket, and said sealing lip on said input adapter cooperates with an annular abrasion ring which rotates with said inner jacket and ends flush with the bore of said inner jacket, at least one annular slot being formed in the face of said abrasion ring which cooperates with the sealing lip.

5. The apparatus claimed in claim 1, including an annular output adapter fixed to the output end of said jacket means to rotate therewith, said output adapter having an annular sealing lip extending toward a material outlet.

6. The apparatus claimed in claim 5, further including a stationary annular abrasion ring mounted on a downstream end plate and disposed radially outwardly of and cooperating with said sealing lip on said output adapter, said abrasion ring having at least one annular slot formed in the face thereof which cooperates with the sealing lip of the output adapter.

7. The apparatus claimed in claim 1, wherein said jacket means comprises an inner jacket with a helical temperature control groove formed in its outer face, and an outer jacket which covers said groove and is arranged coaxially on and is secured to said inner jacket, and an inlet port and an outlet port extending through said outer jacket and communicating with annular slots in a stationary, cylindrical seal carrier surrounding said outer jacket, said seal carrier being connected to inlet and outlet connections for supply and return of a temperature control medium.

8. The apparatus claimed in claim 1, further including a transition piece provided between said extruder screw and said mandrel, said transition piece flaring outwardly in a conical shape towards said mandrel and having conveying webs thereon.

9. The apparatus claimed in claim 1, further including temperature regulation means associated with said mandrel for ascertaining the temperature at the front of said mandrel, the speed of rotation of said jacket means being responsive to said temperature regulation means.

10. The apparatus claimed in claim 1, further including downstream of said mandrel, screw means, a profile disc and an insert defining an orifice and so disposed that they can be dismantled.

11. The apparatus claimed in claim 1, wherein conveying webs rounded on both sides are disposed on said mandrel at an angle of 30°–60°, measured between a vertical line and the axis of said mandrel, whereby said mandrel provides a conveying action.

* * * * *